United States Patent  [11] 3,607,783

| | | | |
|---|---|---|---|
| [72] | Inventors | Antonio Tata<br>Via Valpolicella 39;<br>Glauco Torlontano, Via Nicolo Piccinni 32,<br>both of Rome, Italy | |
| [21] | Appl. No. | 773,949 | |
| [22] | Filed | Nov. 6, 1968 | |
| [45] | Patented | Sept. 21, 1971 | |
| [32] | Priority | Nov. 8, 1967 | |
| [33] | | Italy | |
| [31] | | 40552A/67 | |

[54] SOLUTION FOR PRESERVING MICROSCOPIC CORPUSCLES
10 Claims, No Drawings

[52] U.S. Cl. .................................................... 252/408,
23/230 B, 73/1, 424/2
[51] Int. Cl. ....................................................G01n 31/08,
G01n 33/16
[50] Field of Search .......................................... 252/408;
23/230, 253, 258.5; 73/1; 424/2

[56] References Cited
UNITED STATES PATENTS

| | | | |
|---|---|---|---|
| 2,863,733 | 12/1958 | Drey............................. | 23/230 |
| 3,412,037 | 11/1968 | Gochman...................... | 252/408 |

Primary Examiner—John T. Goolkasian
Assistant Examiner—M. E. McCamish
Attorney—Delio and Montgomery ABSTRACT: Organic corpuscles are purified by forming a dilute suspension of the corpuscles in an aqueous solution containing (a) 0.1–3.0 percent of a halogen salt of a strong base and a strong acid, (b) 0.2–15.0 percent by weight of a salt of a strong base and a strong acid selected from phosphates and sulphates, and (c) 10–400 mg. per 1,000 ml. of solution of a weak organic acid such as acetic acid, wherein the aqueous solution has a pH of 1–4.5.

SOLUTION FOR PRESERVING MICROSCOPIC CORPUSCLES

At present, the availability is still far from being attained of a suspension of organic corpuscles which may keep unchanged in addition to numeric stability, also the volume and form of the corpuscles. The possibility to obtain really stable suspensions ill be invaluable, more particularly to calibrate automatic counting apparatus, stactometers and diluters.

The suspensions of the present invention are particularly suitable for use in the calibration of electronic counters of particles. In this respect, the suspensions of this invention do not have the disadvantages of products such as total blood to be diluted for use, which are presently utilized to calibrate electronic counters.

This type of corpuscle suspension may be used for several purposes and a few examples of such purposes which are most usual nowadays are as follows:

1. Calibration of electronic apparatus for use in the determination of number and volume of microscopic particles;
2. Calibration of automatic and semiautomatic diluting apparatus and pipettes;
3. Preservation of various organic corpuscle suspensions with a possibility of sending them even to places which are very distant from the production place or the place from where they are drawn, for testing purposes.

Accordingly, it is an object of this invention to produce an aqueous suspension of organic corpuscles, wherein there is numeric stability.

It is another object of this invention to produce an aqueous suspension of organic corpuscles wherein there is volumetric stability.

It is a further object of this invention to produce an aqueous suspension of organic corpuscles wherein there is stability as to the form of the corpuscles.

In order to attain these objects, we have tried several solutions which proved fully satisfactory, among which were the following water solutions, comprising (1) associations of salts formed from strong bases and strong acids, and (2) one or more weak acids. As an example, a solution which afforded very good results had the following compositions:

| Sodium chloride | 1g. to 20g. |
| Acetic acid | 10mg. to 400mg. |
| Sodium sulfate | 2g. to 100g. |
| Distilled water | 1,000ml. |

In the preferred form of the embodiment, the pH of the solution should be at 2 to 2.5. The above concentrations are for forming an aqueous suspension of organic corpuscles at a temperature range of 80°–130° F. Should it be desired to form an aqueous suspension at a cooler temperature, that is, within 40°–80° F., then the concentration limits are:

| Sodium chloride | 1g. to 10g. |
| Acetic acid | 10mg. to 400mg. |
| Sodium sulfate | 1g. to 46g. |
| Distilled water | 1,000ml. |

The pH of the solution should, again, be from 2 to 2.5.

It should be understood that, although the presence of acetic acid is preferred, it is not necessary to the present invention. Thus, a stable aqueous suspension may be formed with only the addition of sodium chloride and sodium sulfate within the concentration limits specified above.

The present invention is not limited to the above-mentioned salts and weak acids. Accordingly, in place of sodium chloride, there may be used potassium chloride, potassium bromide and sodium bromide. In the preferred embodiment of the invention, these salts are used along with sodium chloride, wherein the amount of these other salts is up to 50 percent be weight of the weight of sodium chloride and wherein the concentration of the other salts in the solution does not exceed 2 percent by weight.

Further, in place of the acetic acid, there bay be used boric acid, formic acid, tannic acid and citric acid. In the preferred embodiment of this invention, these other weak acids may be used in combination with the acetic acid and may be substituted for up to 50 percent by weight of the acetic acid.

In addition, in place of the sodium sulfate, there may be used neutral sulfates or phosphates, either monoacid or polyacid of alkaline or alkaline-earth metals such as potassium, sodium, calcium, magnesium, lithium, beryllium, barium, strontium, caesium, rubidium, and zinc. There can also be used iron-ammonium sulfates or phosphates and potassium, sodium or magnesium hyposulfites. In the preferred embodiment, these other salts are substituted for up to 50 percent by weight of the sodium sulfate wherein their concentration in the solution does not exceed 2 percent.

The pH of the final suspension can be 1 to 4.5 and is preferably between 2.0 to 4.5. Even more preferably, the pH of the suspension should be within the range of 2.0 to 2.5.

Thus, the aqueous suspension of the present invention is formed by adding to organic corpuscles a solution containing 0.1 to 3.0 percent by weight of a halogen salt, 10 to 400 mg. of a weak acid per 1,000 ml. of solution, and 0.2 to 15.0 percent by weight of a sulfate or phosphate salt. It should be understood that the presence of the weak acid is preferred, but not necessary.

The organic corpuscles and, in particular, blood, is diluted with the solution of the present invention in the proportion of 1:100 to 1:300 to form the final calibrating suspension.

This solution may be used at different concentrations of each chemical component and the following substances may be added thereto: total blood, blood cellular components, or other organic corpuscles, in varying proportions according to the kind of particles to be fixed and volumetric characteristics required in fixing the particles. Should it be desired to obtain a stable suspension of red corpuscles at a mean corpuscle volume of 80 $\mu^3$, it will be proper to fix the total blood by means of the above solution used with the following concentrations of its chemical components:

| Anhydrous sodium chloride | 7g. |
| Crystallized acetic acid | 42mg. |
| Anhydrous sodium sulfate | 7g. |
| Distilled $H_2O$ | 1,000ml. |

The blood to be fixed must be diluted with this solution in the proportion of 1:200. In this way, by using the above dilution or even different solutions, it will be possible to obtain corpuscle suspensions with concentrations more particularly suitable for numerical controls or optical microscopy as well as for preparation of dilutions suitable for single electronic counters, instead of obtaining fixation of blood compounds at original concentrations. The suspension as above-prepared, is preferably kept in ice in order to prevent a possibility of being contaminated with mycetes.

This suspension shows itself numerically stable during a long period of time (undoubtedly more than a year) and the volume of corpuscles will not appreciably change from original volume in the long run. More particularly, the blood corpuscles will keep their biconcave form and will not have a tendency to form aggregations. Moreover, according to experiments we have carried out, they have shown an average volume of 82 $\mu^3$ one month after preparation (the normal values being from 83 to 88 $\mu^3$) and 80 $\mu^3$ seven months after preparation.

Volumetric test has been made by using Coulter electronic apparatus. The numerical control of particles has been carried out by visual computations, and measurements with different electronic counters.

To protect suspensions of the above-mentioned type from contamination with bacteria and mycetes, it will be possible to add suitable supplemental substances to the chemical components as described above. Moreover, in order to prevent sedimentation of the corpuscles in suspension, albuminoid or proteinic substances of any kind may be added.

It will thus be seen that the objects set forth above, among those made apparent from the preceding description, are efficiently attained and since certain changes may be made in the foregoing composition of matter without departing from the spirit and scope of the invention, it is intended that all matter contained in the foregoing description shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An aqueous solution for keeping a suspension of organic corpuscles unchanged as to volume and form of the corpuscles in addition to their numeric stability, containing (a) 0.1–3.0 percent by weight of a halogen salt of a strong base and strong acid, (b) 0.2–15.0 percent by weight of a salt of a strong base and a strong acid selected from phosphates and sulfates, and (c) 10–400 mg. per 1,000 ml. of a solution of a weak organic acid, said aqueous solution having a pH of 1–4.5.

2. A stable composition of organic corpuscles, comprising a dilute suspension of said corpuscles in the aqueous solution of claim 1.

3. A solution according to claim 2, wherein the organic corpuscles are total blood corpuscles.

4. A solution according to claim 2, wherein the organic corpuscles are blood cellular components.

5. A suspension according to claim 2, to which albuminoid or proteinic substances are added in amounts effective to prevent sedimentation of the corpuscles.

6. The composition of claim 2 wherein said corpuscles are present in said aqueous solution at a dilution of 1:100 to 1:300.

7. The solution of claim 1, wherein the weak acid is selected from the group consisting of acetic acid, boric acid, formic acid, tannic acid, and citric acid.

8. A solution according to claim 1, wherein (a) is sodium chloride, (b) is sodium sulfate and (c) is acetic acid.

9. A method for stabilizing organic corpuscles as the volume, form and number of the corpuscles, comprising
 a. forming the aqueous solution of claim 1, and
 b. adding the aqueous solution to organic corpuscles so as to dilute the corpuscles.

10. The method of claim 9 wherein said corpuscles are diluted 1:100 to 1:300.